United States Patent
Rozen et al.

(10) Patent No.: US 9,618,988 B2
(45) Date of Patent: Apr. 11, 2017

(54) METHOD AND APPARATUS FOR MANAGING A THERMAL BUDGET OF AT LEAST A PART OF A PROCESSING SYSTEM

(75) Inventors: Anton Rozen, Gedera (IL); Roy Drucker, Rishon le Zion (IL); Leonid Smolyansky, Zichron Yakov (IL)

(73) Assignee: NXP USA, INC., Austin, TX (US)

( * ) Notice: Subject to any disclaimer, the term of this patent is extended or adjusted under 35 U.S.C. 154(b) by 137 days.

(21) Appl. No.: 14/410,146

(22) PCT Filed: Jul. 3, 2012

(86) PCT No.: PCT/IB2012/053385
§ 371 (c)(1),
(2), (4) Date: Dec. 22, 2014

(87) PCT Pub. No.: WO2014/006450
PCT Pub. Date: Jan. 9, 2014

(65) Prior Publication Data
US 2015/0331466 A1    Nov. 19, 2015

(51) Int. Cl.
*G06F 1/32* (2006.01)
*G06F 1/28* (2006.01)
*G06F 9/46* (2006.01)

(52) U.S. Cl.
CPC .............. *G06F 1/28* (2013.01); *G06F 1/3206* (2013.01); *G06F 9/466* (2013.01)

(58) Field of Classification Search
CPC ............. G06F 1/26; G06F 1/28; G06F 1/3206

USPC .................................................. 713/320, 323
See application file for complete search history.

(56) References Cited

U.S. PATENT DOCUMENTS

| | | | |
|---|---|---|---|
| 5,590,061 A | 12/1996 | Hollowell, II | |
| 7,386,737 B2 | 6/2008 | Finkelstein et al. | |
| 7,878,016 B2 | 2/2011 | Rotem et al. | |
| 8,224,639 B2* | 7/2012 | Inoue | G06F 1/206 703/18 |
| 8,315,746 B2 | 11/2012 | Cox et al. | |
| 9,335,805 B2* | 5/2016 | Priel | G06F 1/324 |
| 2003/0125900 A1* | 7/2003 | Orenstien | G06F 1/3203 702/132 |
| 2008/0022140 A1* | 1/2008 | Yamada | G06F 1/206 713/322 |
| 2009/0290625 A1 | 11/2009 | Riddle et al. | |
| 2013/0138977 A1* | 5/2013 | Herman | G06F 1/3206 713/300 |

OTHER PUBLICATIONS

International Search Report and Written Opinion correlating to PCT/IB2012/053385 dated Mar. 20, 2013.

(Continued)

*Primary Examiner* — Chun Cao

(57) ABSTRACT

A method of managing a thermal budget, for at least a part of a processing system, is described. The method comprises, upon detection of a use case event, determining a thermal budget violation time window for a current use case scenario of the at least part of the processing system, and managing the thermal budget for the at least part of the processing system based at least partly on the determined thermal budget violation time window.

20 Claims, 4 Drawing Sheets

(56) References Cited

OTHER PUBLICATIONS

Coskun Ayse K. et al: "Dynamic Thermal Management in 3D Multicore Architectures" Design, Automation & Test in Europe Conference & Exhibition, 2009. Date '09, Apr. 20-24, 2009, pp. 1410-1415.

Ayoub, Raid et al: "Energy Efficient Proactive Thermal Management in Memory Subsystem" ISLPED'10, Aug. 18-20, 2010, Austin, Texas, USA, pp. 195-200.

\* cited by examiner

METHOD AND APPARATUS FOR MANAGING A THERMAL BUDGET OF AT LEAST A PART OF A PROCESSING SYSTEM

FIELD OF THE INVENTION

The field of this invention relates to a method and apparatus for managing a thermal budget of at least a part of a processing system.

BACKGROUND OF THE INVENTION

Modern integrated circuit (IC) devices are required to provide support for feature-rich applications. Accordingly, such IC devices are required to achieve a high level of performance. In addition, modern IC devices are required to operate within strict thermal budgets. However, during periods of high activity, the power consumption of the IC device may be extremely high, resulting in the IC device exceeding its thermal budget if such high power consumption is maintained for a prolonged period of time.

To avoid the thermal budget for an IC device being exceeded, it is known to implement one or more thermal monitor(s) within the IC device, and to change an operating mode of the IC device to reduce power consumption, and thus heat generation, of the IC device if a monitored thermal reading exceeds a threshold level.

A problem with this conventional solution to avoiding the thermal budget of an IC device being exceeded is that a considerable thermal margin is typically required between the threshold level and the actual thermal budget level in order to allow for a reaction time required for changing the operating mode of the IC device. Such a thermal margin must be set for a thermal slope of a worst case scenario, since the actual thermal slope is not known. For example, such a thermal margin must be sufficient take into consideration variations in ambient temperature, IC device process corners, product specific attributes such as, say, product 'box' dimensions, ventilation, etc. In addition, such a thermal margin must be sufficient for all use cases and IC operations. Thus, in the majority of cases such a thermal margin is greater than actually required, reducing the performance of the IC device unnecessarily early in realistic use cases.

SUMMARY OF THE INVENTION

The present invention provides a method of managing a thermal budget for at least a part of a processing system, an integrated circuit device comprising at least one processing module arranged to perform such a method, a processing system comprising at least one processing module arranged to perform such a method and a tangible computer program product having computer-readable code stored thereon for programming a signal processing module to perform such a method as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

The present invention will now be described with reference to an example of a processing system in which a scheduler module is arranged to perform a method of managing a thermal budget for at least a part of a processing system. It will be appreciated that the present invention is not limited to the specific example herein described and illustrated in the accompanying drawings. Furthermore, because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Figure 1:
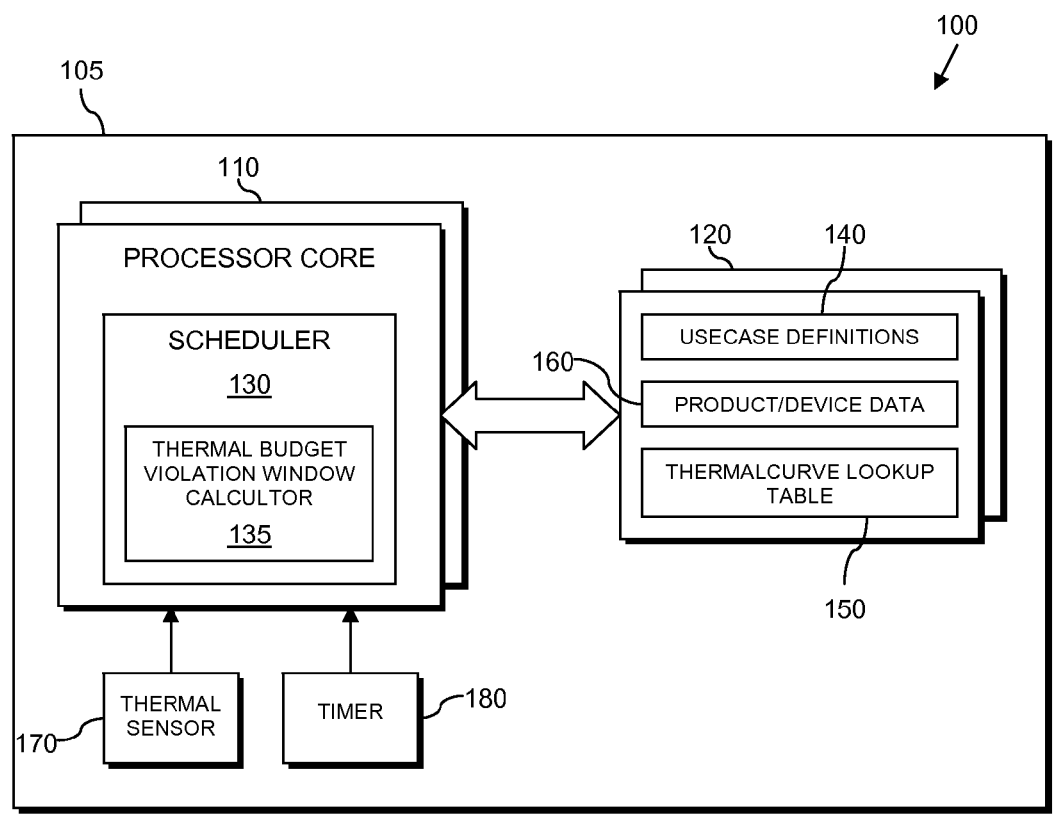
FIG. 1 illustrates a simplified block diagram of an example of a part of a processing system.

Referring first to FIG. 1, there is illustrated a simplified block diagram of an example of a part of a processing system 100 implemented within an integrated circuit (IC) device 105. In the illustrated example, the illustrated part of the processing system 100 comprises one or more signal processing modules, illustrated as processing core(s) 110 in FIG. 1. The processing core(s) 110 is/are arranged to execute computer program code, for example comprising one or more processes, also known as tasks. For clarity, a process is an instance of a computer program that is executed on a processing core. The processing system 100 further comprises one or more memory elements, illustrated generally at 120. In some examples, the memory elements 120 comprise primary memory, for example comprising cache memory, RAM (Random Access Memory), etc, and is arranged to hold computer program code and data accessible by the signal processing module(s) 110. Although the memory elements 120 illustrated in FIG. 1 comprise internal memory elements, in other examples they may additionally and/or alternative comprise external memory elements, for example comprising RAM and/or Flash memory.

In the illustrated example, the signal processing module(s) 110 is/are arranged to execute at least one scheduler module 130, for example which forms a part of an operating system (not shown) running on the processing system 100. Scheduling is a well known method by which processes etc. are given access to system resources, such as processor time, communications bandwidth, etc. Conventionally, scheduling is concerned mainly with throughput (the number of processes that complete their execution per time unit), latency including turnaround (total time between submission of a process and its completion) and response time (amount of time it takes when a request was submitted until the first response is produced), and fairness/waiting time (allocating appropriate processing time to each process according to each process' priority). In practice, these objectives often conflict, and so a scheduler is typically configured to implement a suitable compromise between them. In real-time environments, such as embedded systems for automatic control in industry, a scheduler must also ensure that processes are able to meet deadlines.

A scheduler is an operating system component that selects processes to be admitted into the processing system, and which process is next to be run. It is known for operating systems to comprise up to three distinct types of scheduler: a long-term scheduler (also known as an admission scheduler or high-level scheduler); a mid-term or medium-term scheduler; and a short-term scheduler.

A long-term (admission) scheduler typically decides which jobs or processes are to be admitted to a ready queue held in main memory, for example within the primary memory elements 120 illustrated in FIG. 1. In this manner, when an attempt is made to execute a program, the admission of a process for that program to the set of currently executing processes may be either authorized or delayed by the long-term scheduler. As such, the long-term scheduler dictates what processes are to run within, in the example illustrated in FIG. 1, the processing system 100, and the degree of concurrency to be supported at any one time; i.e. whether a high or low number of processes are to be executed concurrently, and how the split between input/output (10) intensive and processing intensive processes is to be handled. Processes waiting to be admitted to the set of currently executing processes may be held within a long-term queue residing within, for example, secondary memory such as a hard disk (not shown in FIG. 1).

A medium-term scheduler is typically arranged to temporarily remove processes within the set of currently executing processes from main memory and place them within secondary memory and vice versa. This is commonly referred to as 'swapping out' and 'swapping in'. The medium-term scheduler may decide to swap out a process for various reasons, including by way of example:
  a process has not been active for some time;
  a process has a low priority and processes with a higher priority require processing time;
  a process is page faulting frequently (e.g. attempting to access an address space in virtual memory that has not been loaded into physical memory);
  a process is taking up a large amount of memory and there is a need to free up memory for other processes;
  a process has become 'blocked' (i.e. is waiting for a resource to become available);
  etc.

A process that has been swapped out is swapped back in at a later time when, for example, more memory is available, when the process has been 'unblocked and is no longer waiting for a resource, etc. In modern processing systems, the medium-term scheduler may perform the role of the long-term scheduler.

A short-term scheduler (also known as a central processing unit (CPU) scheduler) typically decides which of the 'ready' in-memory processes are to be executed (i.e. allocated a processing core 110) next. As such, the short-term scheduler makes scheduling decisions much more frequently that the long-term or mid-term schedulers. The short-term scheduler may be pre-emotive, whereby it is capable of forcibly removing processes from a processing core 110 when it decides to allocate that processing core 110 to another process.

A further component involved in process scheduling is the dispatcher. The dispatcher is the component that gives control of a processing core 110 to a process selected by the short-term scheduler. Typically the dispatcher is responsible for switching contexts, switching the processing core 110 from a supervisor mode (in which the operating system components such as the scheduling/dispatcher components run) into a user mode (in which the process to be executed is to run), and jumping to the appropriate location in the user program for the selected process in order to (re-)start that program.

For clarity and ease of understanding, a single scheduler module 130 has been illustrated in FIG. 1, and will be herein after referred to. However, it will be appreciated that the various features and functionality herein described with reference to the scheduler module 130 may equally be implemented within a plurality of scheduling components. For example, it is contemplated that the various features and functionality herein described with reference to the scheduler module 130 may be implemented within one or more of a long-term scheduler component, a mid-term scheduler component, a short-term scheduler component and/or a dispatcher component. Accordingly, the term 'scheduler module' used herein, including its use within the claims, is to be understood as incorporating one or more of such scheduling components within an operating system or the like.

Figure 2:
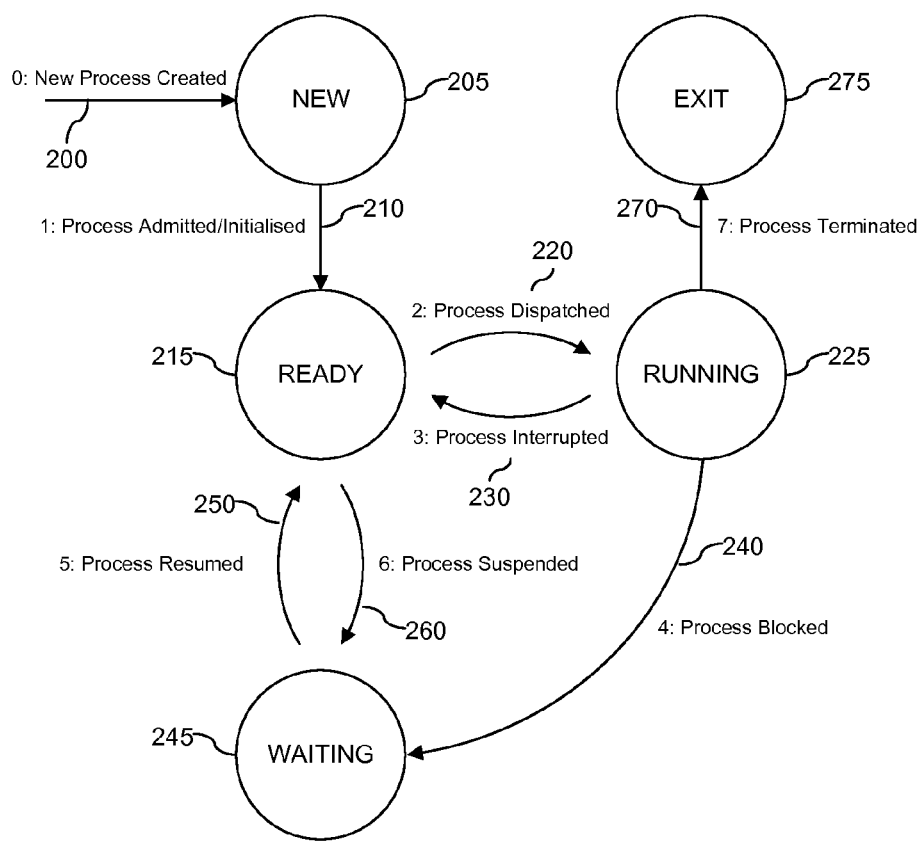
FIG. 2 illustrates a simplified state diagram of an example of process states within the processing system of FIG. 1.

Referring now to FIG. 2, there is illustrated a simplified state diagram of an example of process states within the processing system 100. When a new process is created, as illustrated by transition '0' 200, it occupies a 'New' state 205, in which the process awaits admission to the set of currently executing processes. In this New state 205, the new process (or at least an entry therefor) may be held within a 'long-term' queue residing in, say, secondary memory such as a hard driver of the like (not shown) of the processing system 100. The scheduler module 130, for example a long-term or mid-term scheduling component thereof, thereof decides if and when such a new process is to be admitted to the set of currently executing processes, for example as described above.

Upon being admitted to the set of currently executing processes, a process transitions to a 'Ready' state 215, as illustrated by transition '1' 210. As part of this transition 210 to the Ready state 215, a process control block (also known as a process descriptor) for the process is loaded into main memory, for example into the memory element(s) 120 illustrated in FIG. 1, and the process is entered into a 'Ready' queue and awaits to be scheduled for execution on one of the processing cores 110.

Upon being scheduled for execution on a processing core 110 by the scheduler module 130, a process transitions 220 to a 'Running' state 225. As part of this transition 220 to the Running state 225, a dispatcher component of the scheduler module 130 is responsible for switching context within the allocated processing core 110 to that of the process to be executed, switching the processing core 110 from a supervisor mode (in which the operating system components such as the scheduling/dispatcher components run) into a user mode (in which the process to be executed is to run), and jumping to the appropriate location in the user program for the selected process in order to (re)start that program.

A process may remain in the Running state 225, in which it is being executed by a processing core 110 until the process elects to leave the Running state 225 or until the scheduler module 130 pre-emptively forces the process to leave the Running state 225. In the case of a process interrupt, for example following a clock interrupt, an 10 interrupt, an operating system call or another form of interrupt signal, the process in the Running state 225 may be forced by the scheduler module 130 to transition 230 back to the Ready state 215. As part of this transition 230 back to the Ready state 215, the process control block comprising the current context for that process may be loaded back into main memory 120, and the process is returned to the Ready queue to wait to be rescheduled for execution on one of the processing cores 110 again.

Alternatively, if a process in the Running state 225 becomes 'blocked', for example that process requires some event to occur or some other action to complete before it is able to resume, that process may be transitioned 240 by the scheduler module 130 to a 'Waiting' state 245. As part of this transition 240 to the Waiting state 245, the process control block comprising the current context for that process may be loaded back into main memory 120. Upon that process subsequently becoming 'unblocked', for example the outstanding event occurring or action being completed, the process may then be transition 250 by the scheduler module 130 to the Ready state 215, whereby the process is entered into the Ready queue to wait to be rescheduled for execution on one of the processing cores 110 again.

In some scenarios, a process in the Ready state 215 may be suspended by the scheduler module 130, and transitioned 260 from the Ready state 215 to the Waiting state 245. For example, in a real-time system, the scheduler 130 may be arranged to suspended non-real time, low priority processes in order to enable real-time and/or higher priority processes to meet deadlines or the like.

A process in the Running state 225 may also transition 270 to an 'Exit' state 275, for example upon that process completing its execution. Alternatively, the process may be terminated by, say, the operating system or a parent process. When a process is in the Exit state 275, the operating system is typically required to perform various housekeeping tasks such as freeing up resource assigned to that process, tearing down the process control block for that process, etc.

Other process states may also exist. For example, the scheduler module 130 may be arranged to perform swapping out and swapping in of processes, as described above. Accordingly, an additional state (not shown) may exist for processes that have been swapped out, whereby the process control blocks for such process may be written to secondary memory such as a hard drive (not shown) in order to free up space in the primary memory 120 of the processing system 100.

Referring back to FIG. 1, and in accordance with some examples of the present invention, the scheduling module 130 is arranged to detect a use case event, and upon detection of a use case event to determine a thermal budget violation time window for a current use case scenario of (at least part of) the processing system 100, and manage a thermal budget for the (at least part of the) processing system 100 based at least partly on the determined thermal budget violation time window.

For example, use cases are typically defined on top of an applications superset for a system, and define goal-orientated sets of interactions between external actors (e.g. parties outside the system that interact with the system such as a class of users, etc.) and the system under consideration, such as the processing system 100. The use of the term 'use case' used herein is also intended to incorporate less formerly defined use cases comprising, for example, identified sequences of steps that may occur within the system under consideration.

A use case event may comprise any use case related event such as, by way of example, the start/initiation of a use case, a predefined event within/during the lifecycle of the use case and/or the end/termination of the use case. In some examples, such use case events may be synonymous with the creation or termination of certain processes within the processing system 100. Accordingly, it is contemplated that the scheduling module 130 of FIG. 1 may be arranged to detect a use case event upon a process for a particular program being created or terminated.

For example, and as illustrated in FIG. 1, one or more use case definitions may be stored within memory 120, such as illustrated at 140 in FIG. 1, and accessible by the scheduling module 130, each use case definition comprising at least one use case event identifier, such as an identifier for a process associated with that particular use case event. The scheduling module 130 may be arranged detect when a process identified within the use case definitions as being associated with a particular use case event is created and/or terminated, and in this manner to detect the occurrence of the respective use case event. In some examples, it is contemplated that the use case definitions may comprise an indication as to whether a use case event is to be detected upon the creation of the process associated therewith, upon termination of the process associated therewith, or both. As such, those processes associated with use case events may be considered as a predefined set of use case event processes.

Upon detection of a use case event, the scheduler module 130 is arranged to determine a thermal budget violation time window for a current use case scenario of (at least part of) the processing system 100. For example, upon detection of a use case event, the scheduler module 130 may be arranged to identify active use cases (e.g. based on previously detected use case events), and thus to establish a current use case scenario.

The inventor has identified that use cases often comprise particular activity patterns that involve relatively predictable periods of high/low activity. Accordingly, by identifying a current use case scenario for the processing system 100, a relatively accurate prediction of the system activity over a period of time may be determined, and thus a relatively accurate prediction of power consumption (and thereby heat generation) may be modelled. Accordingly, by establishing a current use case scenario based on identified active use cases, a relatively accurate prediction of when a thermal budget for the processing system 100 will be exceeded may be determined, as described in greater detail below.

For example, the scheduler module 130 illustrated in FIG. 1 comprises a thermal budget violation calculator module 135 component arranged to calculate a thermal budget violation time window for a current use case scenario; the thermal budget violation time window being an estimate of how long before a thermal budget for the processing system 100 will be exceeded. Upon detection of a use case event, the scheduler module 130 may be arranged to request a thermal budget violation time window estimate from the thermal budget violation calculator module 135. Upon receipt of such a request, the thermal budget violation calculator module 135 may identify the current active use cases, and thus identify a current use case scenario for the processing system 100.

Having identified the current use case scenario, the thermal budget violation calculator module 135 may then estimate power consumption for the processing system 100 under the current use case scenario. For example, the thermal budget violation calculator module 135 may be arranged to estimate power consumption under the current use case scenario based at least partly on one or more of:
- processes scheduled for execution within the processing system 100 (e.g. processes in a Ready state);
- processes due to be scheduled for execution within the processing system 100 (e.g. processes in a New state);
- an operating mode of the processing system 100 (e.g. based on whether the processing system 100 is configured to operate in a high performance operating mode or a low power operating mode);
- an on-die leakage measurement and/or estimate for the at least part of the processing system; and
- one or more processing system parameters for the at least part of the processing system (e.g. to take into account processing core characteristics such as whether a processing core comprises a high performance processing core or a low power consumption processing core, which may be used to 'bias' power consumption values for the execution of processes, depending on which type of processing core they are being executed on).

The thermal budget violation calculator module 135 may then calculate a thermal budget violation time window based on an estimated power consumption under the current use case scenario. The thermal budget violation calculator module 135 may also calculate the thermal budget violation time window based further on scaled thermal curve data for the identified use case scenario.

For example, one or more lookup tables comprising thermal curve data for predefined use cases and/or use case scenarios may be stored within memory 120, such as illustrated at 150 in FIG. 1. For example, a thermal curve lookup table may be provided for each predetermined use case, and each row (or column) comprising thermal curve data for a given set of environmental parameters. For example, such environmental parameters may comprise one or more of:
- an indication of a current junction temperature for the at least part of the processing system 100;
- an indication of an ambient temperature for the at least part of the processing system 100;
- at least one product parameter for the processing system 100, for example based on one or more of product 'box' dimensions, ventilation, presence of other power dissipating elements relative to the IC device 105, etc.; and
- a process corner for the IC device 105.

In the example illustrated in FIG. 1, some such environmental parameters, for example such as product parameters, process corner, etc., may be stored within memory 120, such as illustrated generally at 160. Additionally/alternatively some such environmental parameters, for example such as a junction temperature and/or ambient temperature, may be provided by way of alternative means, such as by way of a thermal sensor as illustrated at 170 in FIG. 1.

In this manner, the thermal budget violation calculator module 135 may be arranged to retrieve the (or each) thermal curve lookup table for the (or each) active use case, and to select thermal curve data there from based on the environmental parameter(s), thereby 'scaling' the thermal curve for the use case according to the current environmental conditions. In the case of multiple use cases being active, the scaled thermal curves therefor may then be combined (e.g. by averaging the thermal curve data) to obtain scaled thermal curve data for the current use case scenario.

Alternatively, in some examples where possible use case scenarios are predetermined, one or more lookup tables comprising thermal curve data for predetermined use case scenarios may be provided within memory 120, and used to directly obtained scaled thermal curve data for the current use case scenario based on current environmental parameters. Alternatively, in some examples it is contemplated that scaled thermal curve data may be generated by way of one or more algorithms, with environmental parameters as inputs therefor.

Having obtained/generated the scaled thermal curve data for the identified use case scenario, the thermal budget violation calculator module 135 may then calculate a thermal budget violation time window, for example based on the scaled thermal curve data and the estimated power consumption for the use case scenario, and output the calculated thermal budget violation time window to the scheduler module 130.

For example, in the example illustrated in FIG. 1, each row of a lookup table may comprise thermal curve data representative of, say a time until thermal budget reached (i.e. how long until a thermal budget for the processing system is exceeded) against power consumption for the respective use case (scenario), such data being scaled for the associated environmental conditions.

Figure 3:
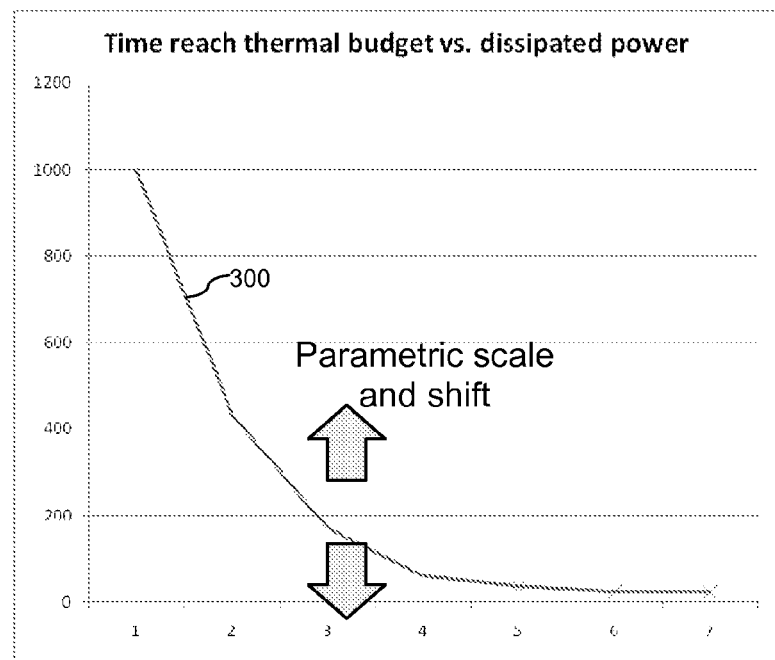
FIG. 3 illustrates a simplified example of a graph comprising a curve representative of thermal curve data for time until thermal budged reached against power consumption for the respective use case.

For example, FIG. 3 illustrates a simplified example of a graph comprising a curve 300 representative of thermal curve data for time until thermal budged reached (x-axis) against power consumption for the respective use case (y-axis), whereby the thermal curve data has been pre-scaled for a given set of environmental parameters. Accordingly, the estimated use case power consumption may be used to determine a time until thermal budget reached from such thermal curve data, and thus to calculate a thermal budget violation time window, for the current use case scenario under the current environmental conditions.

Figure 4:
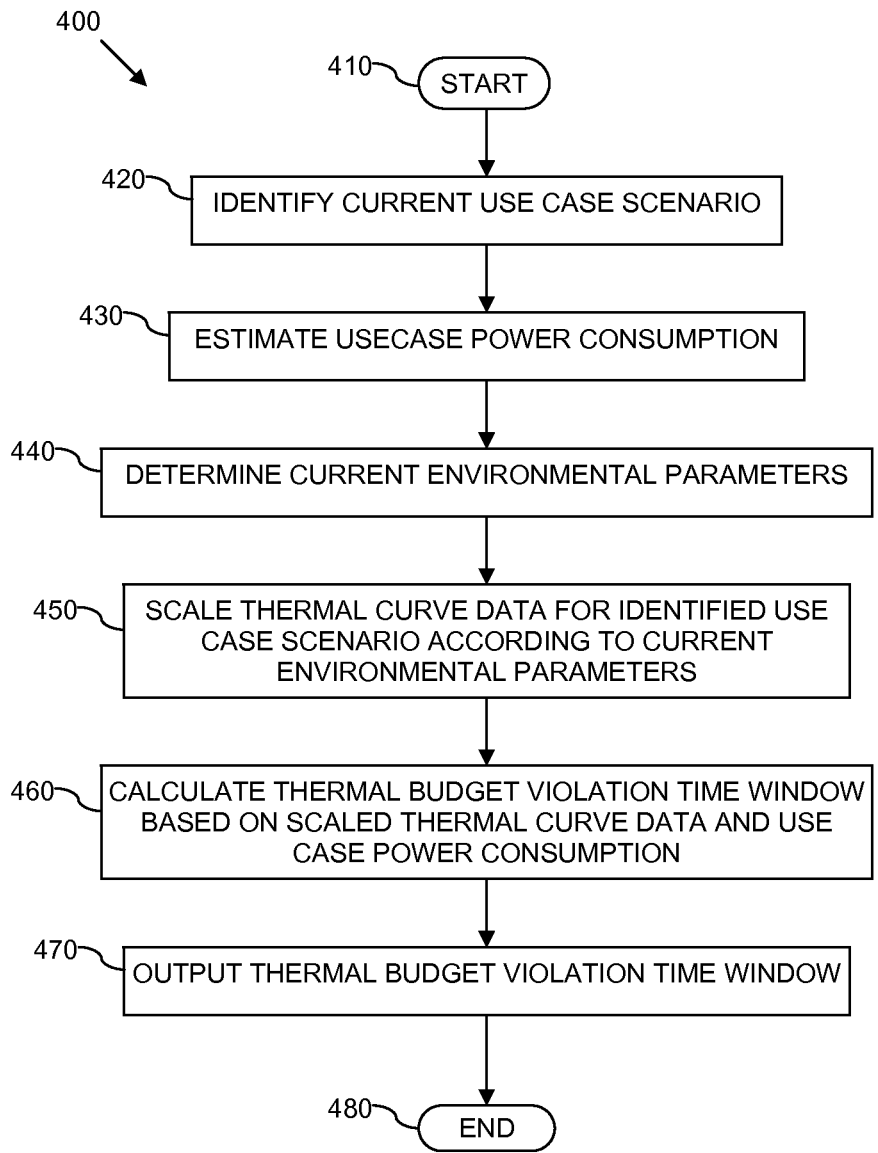
FIGS. 4 and 5 illustrates simplified flowcharts of an example of a method of managing a thermal budget for at least a part of a processing system.

FIG. 4 illustrates a simplified flowchart 400 of an example of a part of a method of managing a thermal budget for at least a part of a processing system comprising calculating a thermal budget violation time window, such as may be implemented by the thermal budget violation calculator module 135 of FIG. 1. The method starts at 410 and moves on to 420 where a current use case scenario is identified. Next, at 430, power consumption for the current use case scenario is estimated. For example, power consumption for the current use case scenario may be estimated based on such factors as processes scheduled (or due to be scheduled) for execution, an operating mode for the processing system, an on die leakage estimate/measurement, processing system parameters, etc. The method further comprises determining current environmental parameters at 440 such as, for example, an indication of a current junction and/or environmental temperature, one or more product parameters, a process corner for an IC device within which the processing system is implemented, etc. Next, at 450, the method comprises scaling thermal curve data for the identified use case scenario in accordance with the determined current environmental parameters. A thermal budget violation time window is then calculated based on the scaled thermal curve data and the estimated power consumption for the current use case scenario, at 460. The calculated thermal budget violation time window is then output at 470, for example to the scheduler module 130 in FIG. 1, and the method ends at 480.

Referring back to FIG. 1, upon receipt of the thermal budget violation time window, the scheduler module 130 may then take steps to manage the thermal budget for the processing system accordingly. In some examples, the scheduler module 130 may schedule the execution of processes within the processing system 100 based at least partly on the received thermal budget violation time window. For example, if the thermal budget violation time window comprised, say, a non-null value (i.e. indicating that the thermal budget for the processing system 100 was due to be exceeded), the scheduler module 130 may be arranged to determine whether one or more performance sensitive processes were scheduled, or due to be scheduled, for execution (e.g. were in a New, Ready or Waiting state). For example, such performance sensitive processes may comprise processes required to perform real-time functions or the like. If one or more performance sensitive processes are scheduled, or due to be scheduled, for execution, the scheduler module 130 may be arranged to determine whether the thermal budget violation time window is due to expire before a time limit for the (or each) performance sensitive process. If the thermal budget violation time window is due to expire before a time limit for at least one performance sensitive process, the scheduler module 130 may then be arranged to reschedule or delay one or more performance non-sensitive processes. For example, the scheduler module 130 may be arranged to suspend one or more performance non-sensitive processes in a Ready or Running state 215, 225, transitioning such processes to a Waiting State 245 until the or each performance sensitive process has completed its required task. Additionally/alternatively, the scheduler module 130 may be arranged to keep any subsequently created performance non-sensitive in a New state 205, thereby delaying the execution of such newly created tasks. In this manner, processing resources may be freed up for the performance sensitive processes, enabling those processes to complete prior to the thermal budget being reached (and thus prior to the processing system 100 having to be reconfigured to a low power mode of operation, which would result in the execution of performance sensitive processes being throttled back).

Additionally and/or alternatively, if the thermal budget violation time window is due to expire before a time limit for at least one performance sensitive process, the scheduler module 130 may then be arranged to reschedule or delay one or more power intensive processes. In this manner, by suspending such power intensive processes, and/or holding newly created power intensive processes in a New state, the power consumption of the processing system 100 may be reduced, thereby effectively extending the thermal budget violation time window, potentially allowing sufficient time for the or each performance sensitive process to complete its required task.

In some examples, if the thermal budget violation time window is due to expire before a time limit for at least one performance sensitive process, the scheduler module 130 may additionally/alternatively re-prioritise processes. For example, the scheduler module 130 may be arranged to raise the priority of the, or each, performance sensitive processes, whilst lowering the priority of performance non-sensitive and/or power intensive processes. In this manner, more processing time and/or resource may be allocated to the performance sensitive processes, enabling them to complete their tasks sooner.

Thus, in this manner, the scheduling of processes may be performed in such a manner as to manage the thermal budget of the processing system 100 in order to better enable performance sensitive processes to complete their tasks within their required time limits.

In some examples, the scheduler module 130 may additionally and/or alternatively be arranged to configure a request for a reduced power state of the processing system 100 ahead of an expiry of the thermal budget violation time window. Advantageously, because the thermal budget violation time window has been calculated based on a current use case scenario, a relatively accurate time window may be calculated. Accordingly, by proactively configuring a request for a reduced power state based on such a calculated thermal budget violation time window (as opposed to reactively reconfiguring a reduced power state based on thermal measurements), a significantly reduced margin for error is required due to the relative accuracy of such a thermal budget violation time window. As such, the processing system 100 may be configured to operate in a low power mode of operation at later point in time, increasing the amount of time that the processing system 100 is able to operate in a high performance mode of operation, and thereby enabling the overall performance of the processing system to be improved.

Figure 5:
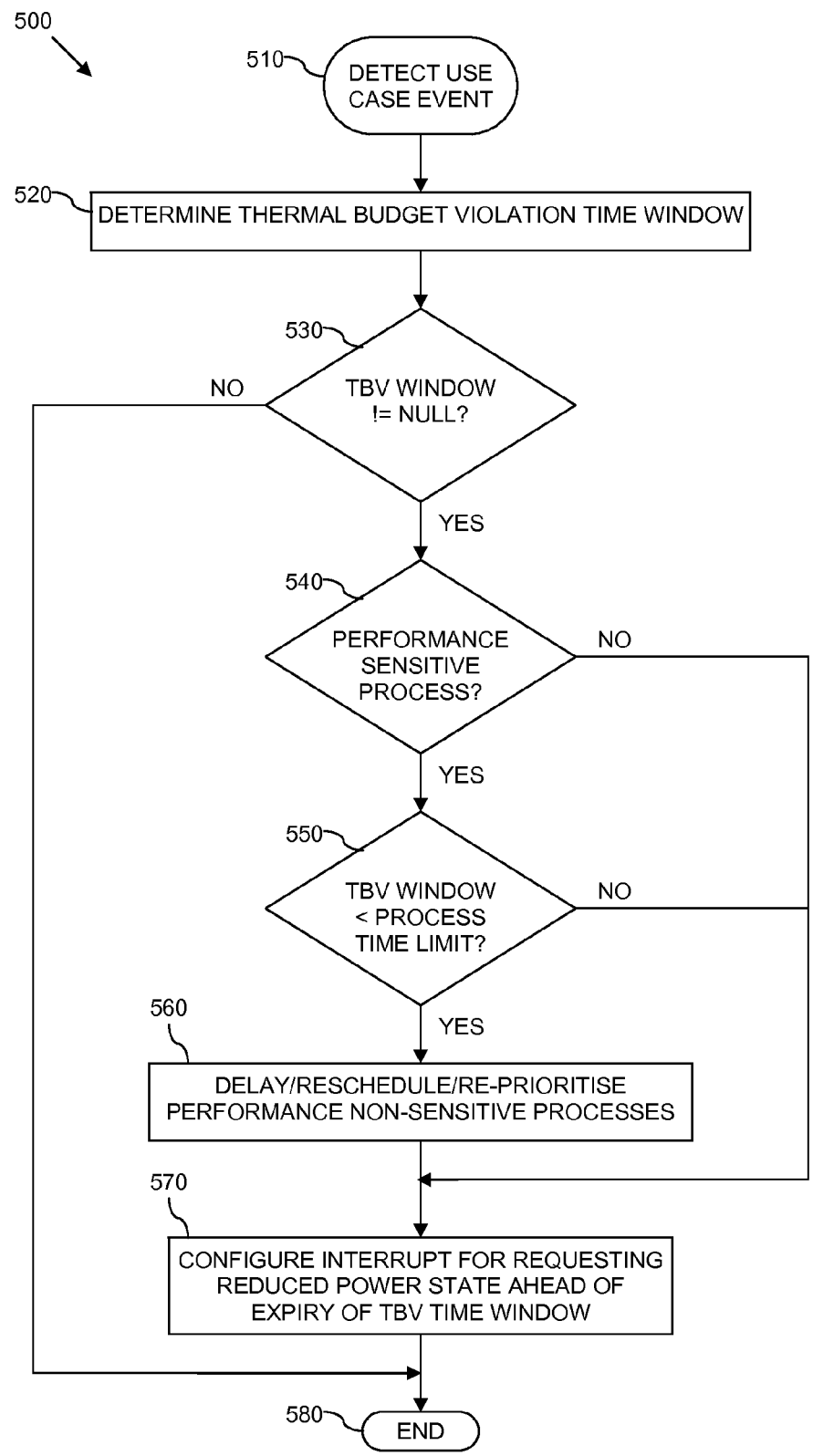

Referring now to FIG. 5, there is illustrated a simplified flowchart 500 of an example of further part of a method of managing a thermal budget for at least a part of a processing system comprising calculating a thermal budget violation time window, such as may be implemented by the scheduler module 130 of FIG. 1. The method starts at 510, with the detection of a use case event. Next, at 520, the method comprises determining a thermal budget violation time window, for example as described in relation to the flowchart of FIG. 4, and as performed by the thermal budget violation calculator module 135 of FIG. 1 described above. Having determined/received the thermal budget violation time window, the method moves on to 530 where it is determined whether the thermal budget violation time window comprises a non-null value (i.e. indicating that the thermal budget for the processing system 100 is due to be exceeded). If the thermal budget violation time window does comprise a null value, the method may simply end at 580. However, if the thermal budget violation time window does not comprise a null value, the method moves on to 540 where it is determined whether one or more performance sensitive processes are scheduler, or due to be scheduled, for execution.

If no performance sensitive processes are scheduled, or due to be scheduled, for execution, the method may move on to 570, where in the illustrated example an interrupt for requesting a reduced power state of the processing system ahead of the expiry of the thermal budget violation time window is configured, and the method ends at 580. However, if it is determined that one or more performance sensitive processes are scheduled, or due to be scheduled, for execution, the method moves on to 550 where it is determined whether the thermal budget violation time window is due to expire before a time limit for the (or each) performance sensitive process. If the thermal budget violation time window is not due to expire before a time limit for the (or each) performance sensitive process, the method may move on to 570, where in the illustrated example an interrupt for requesting a reduced power state of the processing system ahead of the expiry of the thermal budget violation time window is configured, and the method ends at 580. However, if the thermal budget violation time window is due to expire before a time limit for the (or each) performance sensitive process, the method moves on to 560 where one or more performance non-sensitive processes are delayed, rescheduled and/or re-prioritised. The method then moves on to 570, where in the illustrated example an interrupt for requesting a reduced power state of the processing system ahead of the expiry of the thermal budget violation time window is configured, and the method ends at 580.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing processes and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, in the example illustrated in FIG. 1, the scheduler module 130 has been illustrated and described as comprising a distinct thermal budget violation calculator module 135 arranged to determine a thermal budget violation timer window. However, it will be appreciated that such functionality need to be performed by such a discrete component within the scheduler module 130, and may be performed by any suitable component within the scheduler module 130. Furthermore, it is contemplated that the functionality of determining the thermal budget violation time window need not be implemented within the scheduler module 130, and may equally be implemented within a separate function module within, for example, the operating system or otherwise.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of managing a thermal budget for at least a part of a processing system, the method comprising:
 in response to detecting, by a processing core of the processing system, a use case event;
 scaling, by the processing core, thermal curve data, stored at a storage location of a memory of the processing system, based on a current use case scenario and one or more current environment parameters for the at least part of the processing system;
 determining, by the processing core, a thermal budget violation time window for the current use case scenario of the at least part of the processing system based on the scaled thermal curve data; and managing the thermal budget for the at least part of the processing system based on the determined thermal budget violation time window.

2. The method of claim 1, wherein the thermal budget violation time window is further determined based on an estimated power consumption for the current use case scenario.

3. The method of claim 2, wherein the method comprises estimating a power consumption for the current use case scenario based on at least one of:
   at least one process scheduled for execution within the at least part of the processing system;
   at least one process due to be scheduled for execution within the at least part of the processing system;
   an operating mode of the at least part of the processing system;
   an on-die leakage measurement and/or estimate for the at least part of the processing system; or
   at least one processing system parameter for the at least part of the processing system.

4. The method of claim 1, wherein scaling the thermal curve data for the at least part of the processing system is further based on at least one of:
   an indication of a current junction temperature for the at least part of the processing system,
   an indication of an ambient temperature for the at least part of the processing system,
   at least one product parameter for the processing system, or
   a process corner for the at least part of the processing system.

5. The method of claim 1, wherein the method comprises managing the thermal budget for the at least part of the processing system by scheduling at least one process to be executed within the at least part of the processing system based on the thermal budget violation time window.

6. The method of claim 1, wherein the method comprises managing the thermal budget for the at least part of the processing system by determining whether at least one performance sensitive process is scheduled, or due to be scheduled, and if it is determined that at least one performance sensitive process is scheduled, or due to be scheduled, scheduling at least one non performance sensitive process in consideration of the at least one performance sensitive process and the thermal budget violation time window.

7. The method of claim 6, wherein the method comprises performing, if it is determined that at least one performance sensitive process is scheduled, or due to be scheduled, at least one of:
   delaying at least one non performance sensitive process,
   rescheduling at least one non performance sensitive process, or
   re-prioritising at least one non performance sensitive process.

8. The method of claim 1, wherein the method comprises managing the thermal budget for the at least part of the processing system by configuring a request for a reduced power state of the at least part of the processing system ahead of an expiry of the thermal budget violation time window.

9. The method of claim 1, wherein the method comprises detecting the use case event based on at least one of:
   a creation of at least one process within a predefined set of at least one use case event process(es), or
   a termination of at least one process within the predefined set of at least one use case event process(es).

10. The method of claim 1, wherein the use case event comprises at least one of:
    the start/initiation of a use case,
    a predefined event during the life cycle of a use case, or
    the end/termination of a use case.

11. An integrated circuit device comprising:
    a memory configured to store thermal curve data; and
    a processing core coupled to the memory and to detect a use case event, and upon detection of the use case event to:
      scale the thermal curve data based on a current use case scenario and one or more current environment parameters for at least part of the processing system;
      determine a thermal budget violation time window for the current use case scenario of the at least part of the processing system based on the scaled thermal curve data; and
      manage the thermal budget for the at least part of the processing system based on the determined thermal budget violation time window.

12. The integrated circuit device of claim 11, wherein the thermal budget violation time window is further determined based on an estimated power consumption for the current use case scenario.

13. The integrated circuit device of claim 11, wherein the scaled thermal curve data is further based on at least one of:
    an indication of a current junction temperature for the at least part of the processing system,
    an indication of an ambient temperature for the at least part of the processing system,
    at least one product parameter for the processing system, or
    a process corner for the at least part of the processing system.

14. The integrated circuit device of claim 11, wherein the scheduling module is further to manage the thermal budget by scheduling at least one process to be executed within the processing system based on the thermal budget violation time window.

15. A processing system comprising:
    a memory configured to store use case definitions and thermal curve data; and
    a processing core coupled to the memory and to execute a scheduling module to:
      detect a use case event based on the use case definitions, and upon detection of the use case event to:
        scale the thermal curve data based on a current use case scenario and one or more current environment parameters for at least part of the processing system;
        determine a thermal budget violation time window for the current use case scenario based on the scaled thermal curve data; and
        manage the thermal budget for the at least part of the processing system based on the determined thermal budget violation time window.

16. The processing system of claim 15, wherein the thermal budget violation time window is further determined based on an estimated power consumption for the current use case scenario.

17. The processing system of claim 15, wherein the scheduling module is further configured to manage the thermal budget for the at least part of the processing system by scheduling at least one process to be executed within the at least part of the processing system based at least partly on the thermal budget violation time window.

18. The processing system of claim 15, wherein the scheduling module is further configured to manage the thermal budget for the at least part of the processing system by determining whether at least one performance sensitive process is scheduled, or due to be scheduled, and the scheduling module is further configured to, if it is determined that at least one performance sensitive process is scheduled, or due to be scheduled, schedule at least one non performance sensitive process in consideration of the at least one performance sensitive process and the thermal budget violation time window.

19. The processing system of claim 15, wherein the scheduling module is further configured to manage the thermal budget for the at least part of the processing system by configuring a request for a reduced power state of the at least part of the processing system ahead of an expiry of the thermal budget violation time window.

20. The processing system of claim 15, wherein the scheduling module is further configured to detect the use case event based on at least one of:
- a creation of at least one process within a predefined set of at least one use case event process(es), or
- a termination of at least one process within the predefined set of at least one use case event process(es).

* * * * *